US007002740B2

(12) United States Patent
Veith et al.

(10) Patent No.: US 7,002,740 B2
(45) Date of Patent: Feb. 21, 2006

(54) SETTING MODULE FOR THE ILLUMINATION OF AN OPTICAL INSTRUMENT

(75) Inventors: Michael Veith, Wetzlar (DE); Uwe Graf, Solms (DE); Joachim Wienecke, Jena (DE)

(73) Assignee: Leica Microsystems Jena GmbH, Jena (DE)

( * ) Notice: Subject to any disclaimer, the term of this patent is extended or adjusted under 35 U.S.C. 154(b) by 76 days.

(21) Appl. No.: 10/192,874

(22) Filed: Jul. 11, 2002

(65) Prior Publication Data
US 2003/0011882 A1 Jan. 16, 2003

(30) Foreign Application Priority Data
Jul. 12, 2001 (DE) ................. 101 33 993

(51) Int. Cl.
G02B 21/06 (2006.01)
(52) U.S. Cl. ............. 359/390; 362/284; 362/285; 362/324
(58) Field of Classification Search ........... 359/390, 359/381, 382, 389, 385, 368, 386; 362/277, 362/284–286, 319, 324
See application file for complete search history.

(56) References Cited
U.S. PATENT DOCUMENTS

| 1,549,632 A | * | 8/1925 | Trester | 249/219.1 |
| 4,262,989 A | * | 4/1981 | Waters | 359/377 |
| 4,912,388 A | * | 3/1990 | Tanaka et al. | 318/640 |
| 5,138,540 A | * | 8/1992 | Kobayashi et al. | 362/268 |
| 6,179,448 B1 | * | 1/2001 | Johnson et al. | 362/285 |
| 6,286,969 B1 | * | 9/2001 | Kurokawa et al. | 362/11 |

FOREIGN PATENT DOCUMENTS
DE 4034256 A1 * 5/1991

* cited by examiner

Primary Examiner—Mark A. Robinson
Assistant Examiner—Lee Fineman
(74) Attorney, Agent, or Firm—Foley & Lardner LLP

(57) ABSTRACT

The invention refers to a setting module for an illumination apparatus (2) of an optical instrument (1), in particular of a microscope, in which the illumination apparatus (2) comprises a light source (4), an illuminating optical system, and positioning elements (7, 8, 9, 16) with which the position of the light source (4) and/or of the illuminating optical system within the illumination apparatus (2) can be modified. The setting module (17) comprises a module housing (18) having at least one drive device (19, 20, 21, 22) and coupling members (27, 28, 29, 30) for the transfer of a drive motion to the positioning elements (7, 8, 9, 16).

Also described is an illumination system comprising the illumination apparatus and the setting module. The result is to create an alignment capability with excellent functionality and user-friendliness, thereby making possible rapid positional adjustment of the light source and/or the illuminating optical system in the context of use under clean-room conditions.

16 Claims, 5 Drawing Sheets

SETTING MODULE FOR THE ILLUMINATION OF AN OPTICAL INSTRUMENT

CROSS REFERENCE TO RELATED APPLICATIONS

This application claims priority of the German patent application 101 33 993.3 which is incorporated by reference herein.

FIELD OF THE INVENTION

The invention refers to a setting module for an illumination apparatus of an optical instrument, in which the illumination apparatus comprises a light source, an illuminating optical system, and at least one positioning element with which the position of the light source and/or of the illuminating optical system can be modified. The invention furthermore refers to an illumination system having an illumination apparatus and a setting module.

BACKGROUND OF THE INVENTION

Illumination apparatuses having an alignable light source and/or an alignable illuminating optical system are used in many optical instruments in order to fully illuminate a specimen that is to be examined, or a portion thereof. One example thereof is microscopes of all types. These are used, among other purposes, as inspection instruments for the examination of semiconductor wafers. A further example concerns lithography instruments with which a specific pattern is exposed onto a substrate.

Uniform and reproducible illumination of a specimen that is to be examined is very important in many cases in terms of the functionality of such optical instruments. Even slight changes in the location of the light source with respect to the illuminating optical system and the optical axis of the optical system can considerably degrade performance.

In particular when arc lamps are used in combination with extremely high-magnification objectives, conventional illumination apparatuses in many cases can no longer meet present-day requirements. This applies in particular to demanding inspection and measurement tasks in the UV (ultraviolet) and DUV (deep ultraviolet) regions. The reasons for this include inadequate stability and hitherto insufficient or complex alignment capabilities.

External influences such as vibrations and shock can result in a misalignment of the light source relative to the illuminating optical system. As a result of high thermal loading and the effect of strong UV light, changes that negatively affect the intensity of the emitted light over time occur on the internal surfaces of the illumination apparatus housing. Such deviations can usually be alleviated by realigning the light source, the illuminating optical system, or both together. Suitable light sources are, for example, an incandescent lamp, halogen lamp, discharge lamp, or laser light source. The illuminating optical system can be constituted by a reflector, a lens element, a lens system, a diaphragm, or a combination of such components.

Especially in illumination apparatuses that are used in instruments under clean-room conditions, it is moreover essential to take into consideration the problem of contamination of the specimens that are to be examined, which can result from the changes in the surfaces of the lamp housing.

SUMMARY OF THE INVENTION

Proceeding therefrom, it is the object of the invention to simplify the alignment of one or indeed several illumination apparatuses belonging to an optical instrument.

The object is achieved, for an illumination apparatus of the kind cited initially, by way of a setting module having a module housing that can be attached to and removed from the illumination apparatus; having coupling members, substantially corresponding in number to the number of positioning elements and guided outward from the interior of the module housing, which are configured for the transfer of drive motions to the positioning elements and each one of which is positively or nonpositively joined to one of the positioning elements when the module housing is attached; and having at least one drive device that is housed in the module housing and is controllable from outside the module housing.

The illumination apparatus encompasses a lamp housing, and a light source and an illuminating optical system which are arranged in the lamp housing, and an adjustment device that is also arranged in the lamp housing and is coupled to the light source and/or to the illuminating optical system in such a way that the latter can be adjusted in at least one coordinate direction in each case, parts of the adjustment device in the form of positioning elements being accessible from outside the lamp housing and being configured for the transfer of drive motions from the coupling members to the light source and/or to the illuminating optical system.

The solution according to the present invention permits easy realignment or indeed initial alignment after a replacement of the light source. The setting module that can be attached to the lamp housing of the illumination apparatus is used for that purpose, but it needs to remain on the lamp housing only for the alignment period. In the case of a realignment in particular, it is not necessary to open the lamp housing. Instead, interfaces in the shape of the positioning elements, by way of which the alignment can be performed from outside, are present on the exterior of the lamp housing.

The separate setting module moreover makes possible a compact configuration of the illumination apparatus, since it is removed from the illumination apparatus after an alignment and thus requires no space while the optical instrument is being used for its intended purpose. The setting module can furthermore be used as a particularly compact and easily handled alignment tool for several illumination apparatuses having similar interfaces, i.e. similarly arranged coupling members.

In a very simple embodiment, the setting module is used to effect an adjustment in only a single coordinate direction, for which purpose a single drive device in the setting module, acting on one coupling member, is sufficient.

Preferably the adjustment device within the illumination apparatus has, for each coordinate direction in which the light source and/or the illuminating optical system is adjustable, separate linkage elements which are connected to a positioning element that is associated with the respective coordinate direction and is accessible from outside. In this manner it is possible to make an adjustment separately in each coordinate direction that is provided, so that exact orientation of a lamp base or lamp, and/or of the reflector, is easily achieved. Both translational and rotational adjustment motions can be implemented.

For example, for a light source in the form of a lamp, e.g. an incandescent lamp, halogen lamp, discharge lamp, or laser beam source, three translational and optionally also one rotational degree of freedom are provided for adjustment. If an illuminating optical system having a reflector is used, the latter can be adjusted, for example, in one translational and two rotational degrees of freedom. For a lens, e.g. a collector lens, three translational degrees of adjustment freedom are usually provided. If the light source and the illuminating optical system are constituted by a laser device, an adjustment of the laser head and/or of any lenses that are present can be performed. It is also possible to align the entire laser device, as a unit, in several degrees of freedom.

It is also within the context of the invention to provide adjustment capabilities for only some of the aforesaid degrees of freedom or coordinates. In one embodiment of the invention, for example, a lamp is adjustable in three coordinate directions and a reflector in only one coordinate direction.

An interlock device for interlocking releasable connection to the module housing is preferably provided on an outer wall of the lamp housing. This permits temporary attachment of the setting module to the lamp housing, and moreover creates a centering effect so that reliable connection of the respective coupling members to the associated positioning elements is guaranteed.

The interlock device can be implemented very easily on the illumination-apparatus side by way of slot-shaped wall openings that can be produced economically. Movable hooks that can interlock with the slot-shaped wall openings can then be provided, for example, on the setting-module side. For decoupling, an unlocking apparatus with which the interlocking engagement can be nullified is provided on the setting module.

The capability of coupling the setting module is, in principle, independent of the configuration of the lamp housing, in particular of whether the latter is configured as an open or closed housing; what is critical is that the respective coupling members can be brought into positive or nonpositive engagement with the positioning elements. With regard to the contamination problem mentioned earlier, however, it is advantageous if the lamp housing is completely closed.

In an advantageous embodiment of the setting module, a separate drive device is provided for each coupling member. This results in a high level of setting flexibility. For example, a position correction can thus be performed in a plurality of different coordinates.

The number of coupling members on the setting module preferably corresponds exactly to the number of positioning members on the illumination apparatus. This is advantageous for rapid alignment. If a separate drive device is additionally provided for each coordinate direction, alignment can be performed separately for each coordinate direction.

Also conceivable, however, is utilization of the setting module firstly only for adjustment of the light source and then, after a change in attachment position, for an adjustment of the illuminating optical system.

Operation of the setting module or of its drive devices is preferably accomplished by way of relative correction variables for the coordinate direction, for example in the form of increments; as a result, the setting module can be utilized universally for a plurality of lamp housings, and is usable without the need for direct sensing of the present position of the light source or the illuminating optical system.

Preferably a positioning force limiter or torque limiter is furthermore provided for each drive device. This prevents damage to the adjustment device. For that purpose, the positioning force limiter or torque limiter is matched appropriately to the adjustment device and to a stop provided for the respective coordinate direction.

If, upon attachment of the setting module to the illumination apparatus, each coupling member of the setting module can be coupled positively to a positioning member of the illumination apparatus, good transfer of the drive motion from the drive devices of the setting module to all the elements in the illumination apparatus that are to be adjusted can easily be achieved. As already stated, a temporary attachment of the setting module to the lamp housing of the illumination apparatus can be realized by way of interlock devices, for example in the manner of a bayonet connector.

In a further advantageous embodiment, a controller is provided that is configured to generate control outputs for each of the drive devices. Also present is an operating console having means for command input with which positioning commands for adjustment of the light source and/or the illuminating optical system can be entered manually.

The controller and the setting module can be configured separately as separate devices that can be temporarily coupled to one another via a connecting conductor. This division into separate units allows a particularly compact design for the setting module, which thus can be attached particularly easily to an illumination apparatus even in confined spaces. As a deviation from this, however, it is also possible to integrate the controller and the setting module into a common housing.

In addition, the operating console and controller can also be configured as separate devices that can be temporarily coupled to one another via a data connection. The data connection can be accomplished by way of a conductor, but alternatively also wirelessly. As a result of the separate arrangement of the operating console, the drive devices in the setting module can be remotely controlled. For example, alignment can be performed directly from a location at which the illumination quality is measurable.

As an alternative to this, however, it is also possible to integrate the operating console and controller into a common housing, or even to integrate the operating console into the optical instrument and connect it permanently thereto.

The operating console can, as a component of the optical instrument, simultaneously also be used to control the latter. An operating console of this kind can also be configured as an external unit that can be temporarily coupled to the optical instrument via a data connection, i.e. via a conductor or also wirelessly. An operating console of this kind can moreover be provided in addition to an operating console integrated into the optical instrument, in which context the external unit, if applicable, needs to possess only limited control capabilities.

Also proposed is an illumination system comprising an illumination apparatus and a setting module of the kind explained above.

In the illumination apparatus, a lamp housing encloses a light source, an illuminating optical system, and at least one adjustment device, equipped with positioning elements, for modifying the position of the light source and/or the illuminating optical system respectively in at least one of the coordinate directions X, Y, and Z.

In the setting module, a module housing encloses at least one drive device, coupling members for the transfer of drive motions to the positioning elements of the illumination apparatus, a controller for the generation of control outputs for the drive device, and an operating console for the input of commands for specific adjustment of the position of the light source and/or the illuminating optical system.

The module housing can be attached to the lamp housing and removed again from the lamp housing, and when the module housing is attached, each coupling member is in positive and/or nonpositive engagement with a respective positioning element for the purpose of transferring the drive motions.

The light source can be configured as a laser radiation source, discharge lamp, or other source emitting in the visible or invisible light region. Depending on the light source and the intended application of the optical instrument, the illuminating optical system can be configured as a lens system, mirror system, combined lens/mirror system, pinhole arrangement, fiber optic system, or in some other fashion, in order to direct, collimate, and/or focus the light emitted by the light source onto a specimen.

BRIEF DESCRIPTION OF THE DRAWINGS

The invention will be explained in more detail below with reference to an exemplary embodiment depicted in the drawings, in which.

DETAILED DESCRIPTION OF THE INVENTION

Figure 1:
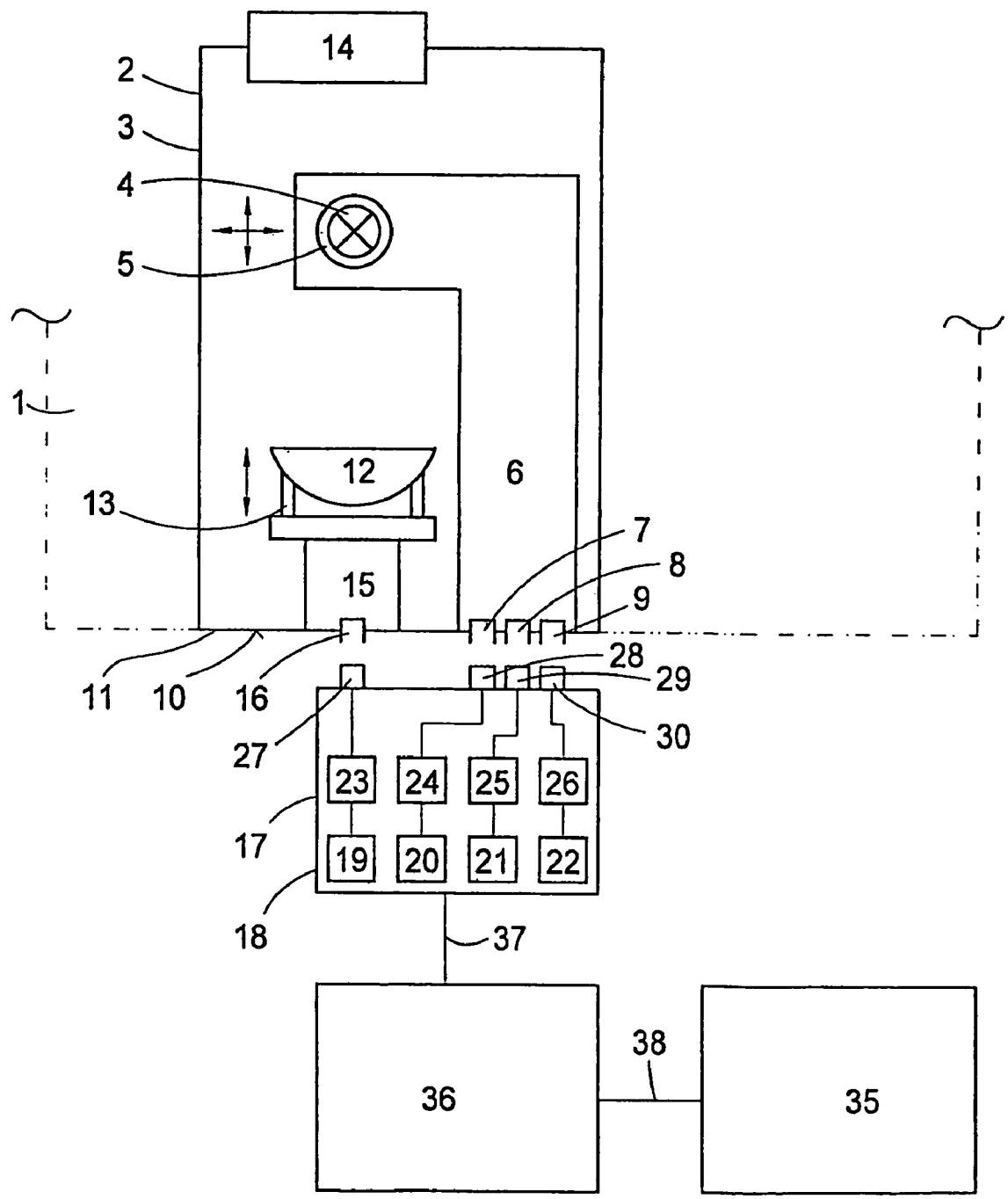
FIG. 1 shows an exemplary embodiment of an illumination apparatus and an associated setting module as a combined system.
Figure 3:
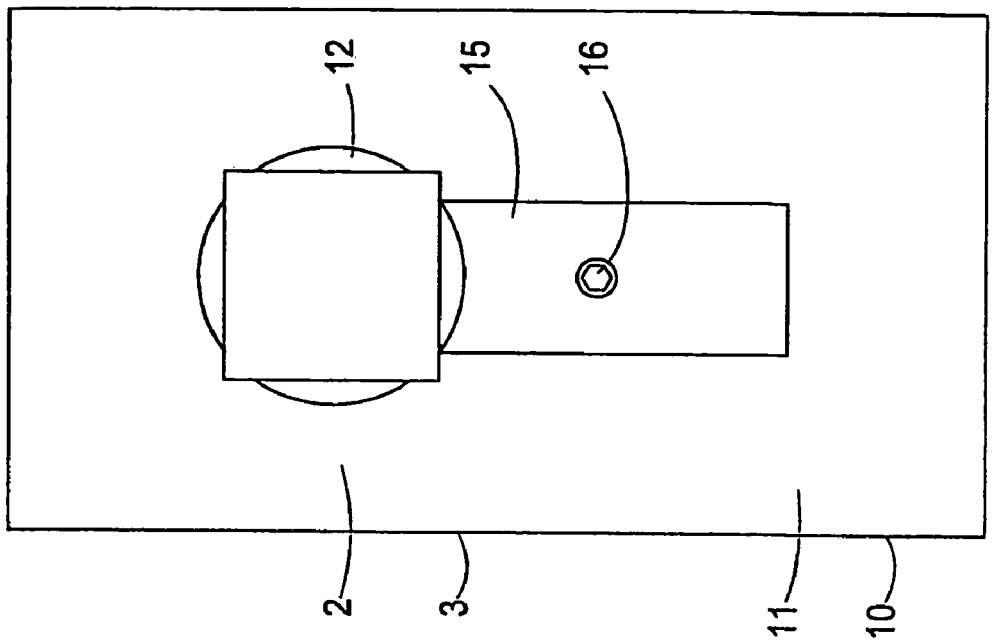
FIG. 3 is a side view of the illumination apparatus and the positioning element for adjustment of the reflector, the lamp and its positioning element not being depicted in the drawing.

The exemplary embodiment schematically depicts an optical instrument 1 in FIG. 1. Optical instrument 1 is here assumed, by way of example, to be an inspection microscope for the examination of semiconductor wafers.

An illumination apparatus 2 is present on optical instrument 1. This illumination apparatus 2 has an externally closed lamp housing 3, so that the subassemblies arranged within lamp housing 3 are sealed off with respect to optical instrument 1. The risk of contaminating the semiconductor wafers that are to be examined is thereby minimized.

Within lamp housing 3, a light source 4—which here is intended to be embodied, by way of example, as a UV arc lamp—is received in a lamp base 5. Power is supplied to the lamp in conventional fashion, so that no further explanation thereof is necessary. Other lamps can, however, also be utilized. In principle, an incandescent lamp, halogen lamp, or discharge lamp can be used here.

Figure 2:
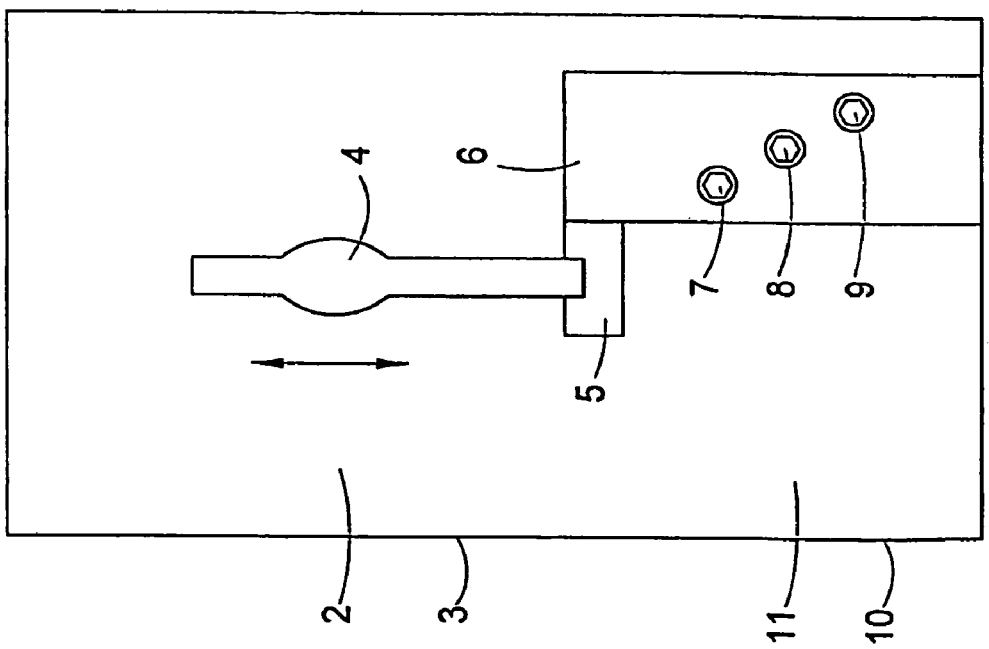
FIG. 2 is a side view of the illumination apparatus having a lamp and a reflector as well as an adjustment device, the positioning elements of the adjustment device for displacement of the lamp being shown, but the reflector and its positioning element not being depicted in the drawing.

Lamp base 5 is translationally displaceable in three coordinates with respect to lamp housing 3. The directions for the displacement of lamp base 5 are each indicated in FIG. 1 and FIG. 2 with double arrows.

Also arranged in lamp housing 3 is an adjustment device. One portion of the adjustment device is coupled to lamp base 5, and enables motion in the three coordinate directions X, Y, and Z. The maximum adjustment travels in this context are limited by stops (not depicted further).

The adjustment device comprises a first linkage 6 for light source 4. First linkage 6 possesses separate linkage elements for each coordinate direction in which lamp base 5 is movable. These linkage elements each encompass at least one positioning element that is accessible from outside lamp housing 3. The externally accessible positioning elements 7, 8, 9 serve for connection to a setting module 17 that will be explained in further detail below.

Positioning elements 7, 8, and 9 are configured, for example, as shaft ends, having an internally hexagonal profile, whose respective end faces terminate approximately flush with outer wall 10 on back side 11 of lamp housing 3.

Also arranged within lamp housing 3 is an illuminating optical system that in this case comprises at least one reflector 12. Reflector 12 is mounted on tilt alignment elements 13 and is adjustable with respect to a light exit opening 14, as indicated in FIG. 1 by the double arrow next to reflector 12. Located on light exit opening 14 is a mechanical interface to optical instrument 1, as well as a device (not depicted further) for temperature decoupling.

For focusing, the illuminating optical system or reflector 12 is coupled to a second linkage 15, i.e. via further linkage elements of the adjustment device, to a positioning element 16 that is accessible from outside lamp housing 3 and serves for coupling of an attachable motorized setting module 17. Positioning element 16 is here once again a shaft end, having an internally hexagonal profile, that terminates flush with outer wall 10 on back side 11 of lamp housing 3.

It is of course also possible to recess positioning elements 7, 8, 9, and 16 more deeply below outer wall 10, or alternatively also to allow them to project beyond it. A different shape can also be provided instead of an internal hexagon. The adjustment of light source 4 and of the illuminating optical system is preferably accomplished by introducing a rotary motion into positioning elements 7, 8, 9, and 16. It is also possible, however, to bring about the adjustment motion by way of a purely translational motion or via a spindle motion.

The adjustment device or its adjustment linkages 6 and 15, with which motions of positioning elements 7, 8, 9, and 16 are converted into adjustment motions, can be configured e.g. as gear linkages, belt linkages, or flexible shafts.

Figure 4:
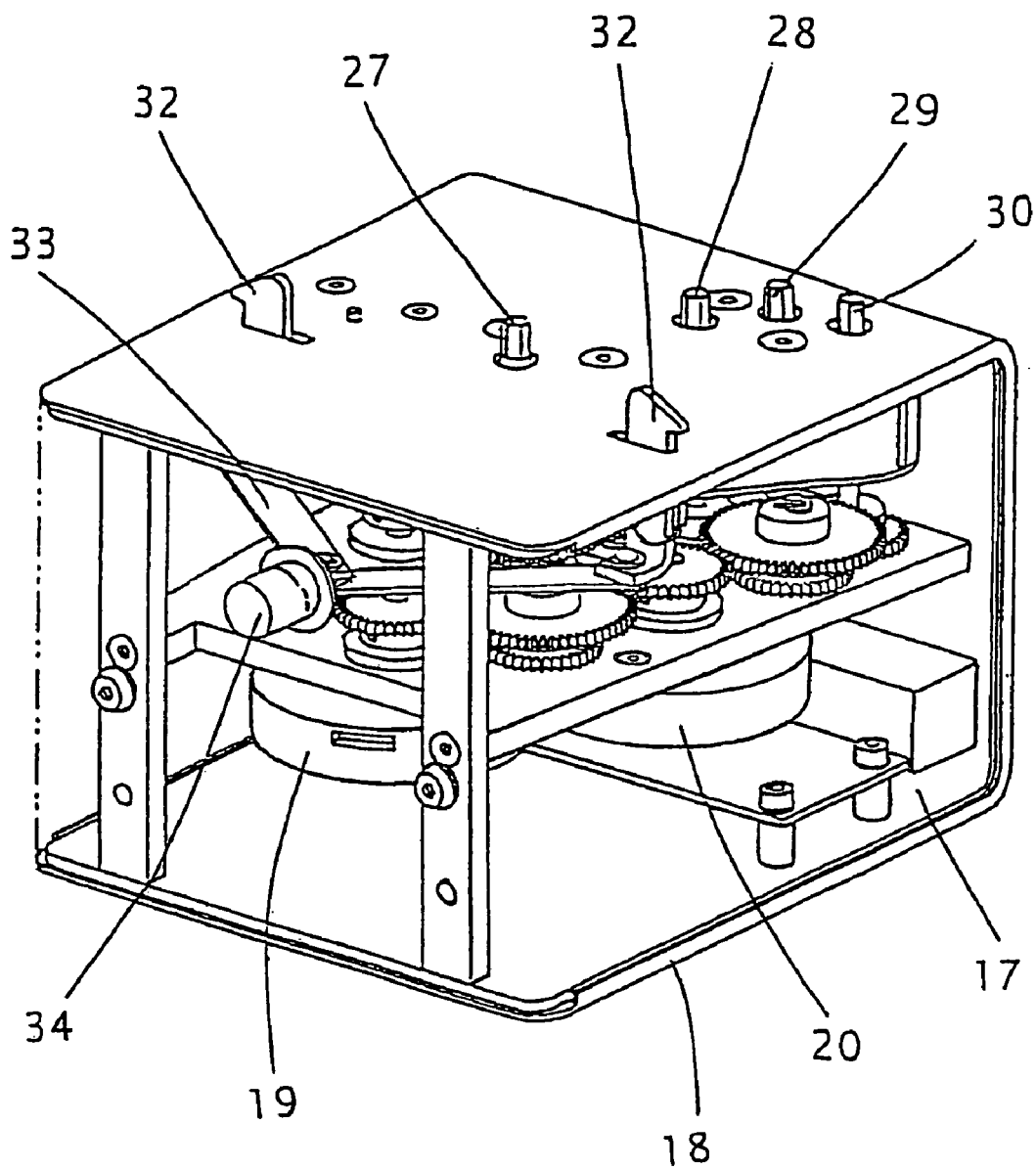
FIG. 4 is a perspective view of the setting module, illustrated here with the module housing partially open.
Figure 5:
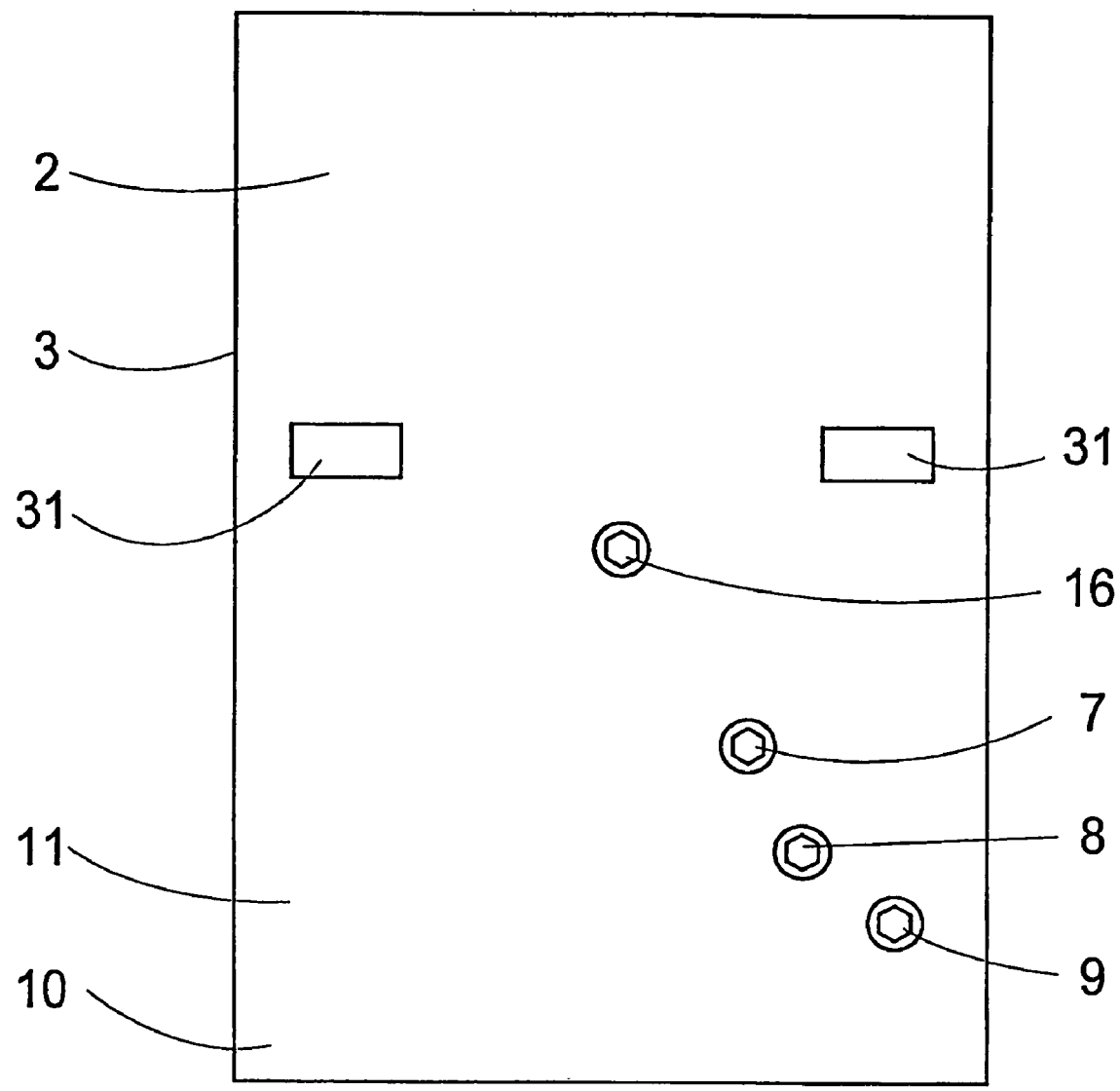
FIG. 5 is a view of the side of the lamp housing of the illumination apparatus onto which the setting module is attached.

FIG. 1 furthermore schematically shows the aforementioned setting module 17, which is depicted in detail in FIG. 4. Setting module 17 is enclosed by a module housing 18 that can be attached from outside to lamp housing 3. Arranged inside module housing 18 in this case are separate drive devices 19 through 22, in the form of stepping motors, for each adjustable coordinate direction of lamp base 5 and reflector 12. These drive devices 19 through 22 are joined via respective individual linkages 23 through 26 to coupling members 27 through 30 which are accessible from outside module housing 18.

Individual linkages 23 through 26 are depicted in FIG. 4, by way of example, as gear linkages. Other types of linkages can, however, also be utilized here. Belt drives have proven to be particularly favorable in this context. Also conceivable are flexible shafts or even direct driving of coupling members 27 through 30.

Each coupling member 27 through 30 of setting module 17 is configured, for transfer of a drive motion, in complementary fashion to the respective associated positioning element 7, 8, 9, and 16 of illumination apparatus 2. In the exemplary embodiment, coupling members 27 through 30 on setting module 17 are shaft ends, having an externally hexagonal profile, that project out beyond the outer wall of setting module 17. Upon coupling of setting module 17 to lamp housing 3, coupling members 27 through 30 of setting module 17 come into engagement with the corresponding internally hexagonal profiles of positioning elements 7, 8, 9, and 16. This makes possible a positively engaged transfer of the rotational drive motions of drive devices 19 through 22 and conversion thereof, by means of adjustment linkages 6 and 15 within illumination apparatus 2, into a linear adjustment motion of lamp base 5 and reflector 12 in the respectively relevant coordinate.

Each of these adjustment motions can be accomplished independently of the adjustment motions in the other coordinate directions. As a result, the position of light source 4 or lamp base 5, and that of reflector 12, can be aligned without needing to open lamp housing 3 for that purpose. To prevent damage to adjustment linkages 6 and 15, suitable torque limiters are provided in setting module 17 for drive devices 19 through 22, respectively.

Also present in illumination apparatus 2 for each coordinate, in addition to the aforementioned stops, are limit switches to interrupt operating voltage for the pertinent drive devices 19 through 22. Return messages from the limit switches are sent to a control device 36 that is explained in further detail below. A cable plug connection is provided on illumination apparatus 2 for signal transfer. A wireless signal transfer is also possible.

Upon coupling of setting module 17 to lamp housing 3 of illumination apparatus 2, the two units are temporarily interlocked with one another. Present for that purpose on the housing sides provided for coupling are suitable interlock devices that make possible a self-retaining connection for a desired period of time, but that can also easily be uncoupled again thereafter and thus allow setting module 17 to be removed after completion of the alignment work.

In the exemplary embodiment depicted, a bayonet connector is provided by way of example for this purpose. The bayonet connector is constituted by two hooks 32, movable with respect to one another, that interlock with slot-shaped wall openings 31. Hooks 32 are coupled to an unlocking device 33 with which hooks 32 can be moved toward one another in order to bring them out of engagement with slot-shaped wall openings 31. Unlocking device 33 has for that purpose a button 34, actuation of which triggers this motion. As FIG. 4 shows, hooks 32 and the unlocking device are arranged on setting module 17. Slot-shaped wall openings 31, however, are located on illumination apparatus 2.

Drive devices 19 through 22 are controllable from outside module housing 18, i.e. correction commands for the position of light source 4 and the illuminating optical system, or of lamp socket 5 and reflector 12, can be defined from outside and converted into a correction motion or alignment motion. The correction commands are defined by a monitoring person who enters them via an operating console 35. From the correction commands, control outputs for the individual drive devices 19 through 22 are generated in a controller 36. Power to drive devices 19 through 22 can also be supplied via controller 36, which is connected to setting module 17 via a conductor 37 or is integrated directly into setting module 17 or its module housing 18. The effects of the correction commands for alignment can be observed by the monitoring person on optical instrument 1, and corrected again if applicable.

In the exemplary embodiment depicted in FIG. 1, both controller 36 and operating console 35 are configured as separate units. Transfer of the correction commands from operating console 35 to controller 36 is accomplished via a data line 38. Instead of this data line 38, however, provision can also be made for a wireless data transfer, for example by means of infrared radiation or ultrasound. The unrestricted mobility of operating console 35 results in a high level of operating convenience, in the manner of a remote control.

As a modification of the exemplary embodiment, operating console 35 or its functionality can be integrated into an operating console provided on optical instrument 1 and joined permanently thereto. Optionally, an external operating console 35 can additionally be connected. This is advantageous in particular when controller 36 is arranged in module housing 18 of setting module 17.

Alternatively, it is also possible to combine operating console 35 with controller 36 into one unit. A personal computer, for example, can be used for that purpose.

The adjustment possibilities are moreover not limited to the coordinates described here. Instead, further directions for adjustment can be provided, for example, on reflector 12, for which purpose further pairs of coupling members and positioning elements must then be provided in appropriate quantities.

With regard to lamp base 5, for example, a rotational degree of freedom, for example about the longitudinal lamp axis, can also be provided. Numerous sub-combinations of adjustment possibilities can also be created from the aforesaid coordinates.

It is furthermore possible to arrange the positioning elements for the adjustment of lamp base 5 and the positioning elements for the adjustment of reflector 12 in identical fashion, so that it is possible to utilize a setting module 17 whose interfaces are configured for coupling to only one subgroup of positioning elements of illumination apparatus 2. For example, firstly only lamp base 5 can be aligned, and after a reattachment of setting module 17 an alignment only of reflector 12 can be performed. This has the advantage that setting module 17 itself remains relatively simple in terms of design even in the context of a large number of setting capabilities.

The invention is furthermore not limited to the alignment of a lamp or a reflector. Instead, lenses or diaphragms can also be correspondingly aligned as adjustable components. In addition, a laser device having a light-generating laser head and a lens arrangement made up of one or more lenses and optionally further diaphragms can serve as the light source and illuminating optical system. In this context, it is possible to arrange the laser head and lens arrangement in individually positionally adjustable fashion. Alternatively, the laser device can also be arranged in the lamp housing of the illumination apparatus as a unit that is adjustable both translationally and rotationally in several coordinates. Laser diodes, gas lasers, and solid-state lasers can be used as light sources in this context.

Figure 6:
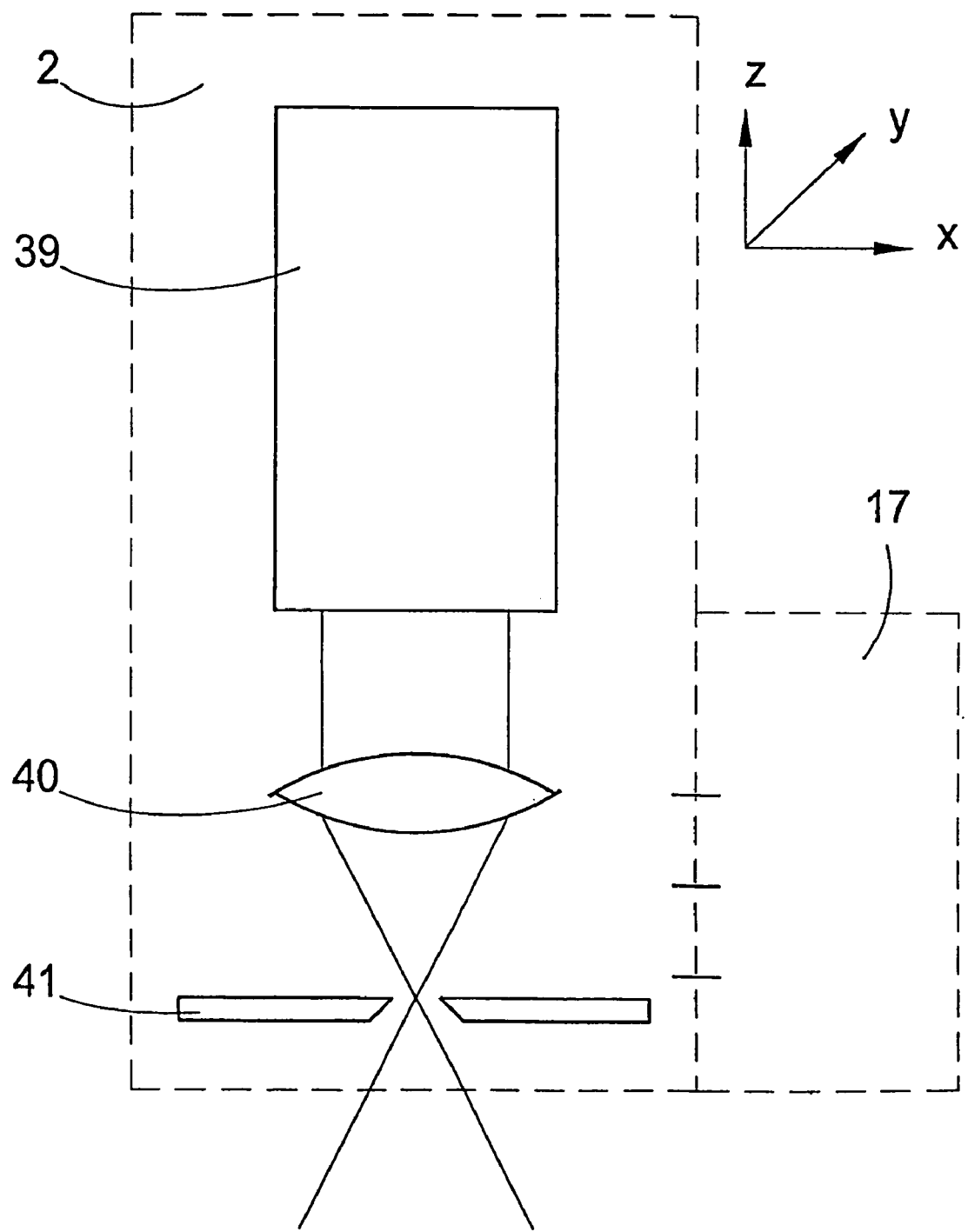
FIG. 6 shows an embodiment of the invention having a laser as the light source.

An example relating to this is depicted in FIG. 6. In this instance a laser radiation source 39 is provided inside illumination apparatus 2, and has arranged after it in the beam path of the laser light a collimating lens 40 (or lens system) and a pinhole 41. Illumination apparatuses of this kind serve, for example in microscope arrangements, to image pinhole 41, irradiated with laser light, into a specimen and to illuminate the location to be examined therein with the intensity distribution of an Airy disc; the image of that location is then generated on a measurement pinhole (not depicted here) that is conjugated in terms of position and size with pinhole 41.

It will merely be mentioned here that the positioning of laser radiation source 39, lens 40, and pinhole 41 in relation to one another is of substantial importance for the operation of a microscope arrangement of this kind, and the necessity thus exists for alignment in terms these positions, both during manufacture of this illumination apparatus and in the context of maintenance.

This can be accomplished in the manner described above, by the fact that in this case as well, a setting module 17 is temporarily coupled onto illumination apparatus 2 for the duration of the alignment operation. Here again, it is possible in principle to adjust both laser radiation source 39 and lens 40 and pinhole 41 in the X, Y, and Z coordinates in each case. As a deviation from this, provision can of course also be made to provide only selected coordinate directions in each case, for example only X and Y, as the adjustment directions, or to perform angular adjustments by rotation about the optical axis. For that purpose, setting module 17 is to be embodied in accordance with the requirement in the manner already explained, and the interfaces (i.e. the positioning elements on illumination apparatus 2 on the one hand and the coupling members on setting module 17 on the other hand) are to be configured accordingly.

What results in all these cases is an alignment system with excellent functionality and a high degree of user-friendliness, which makes possible easy and rapid adjustment of the positions of components of an illumination apparatus and is suitable for use under clean-room conditions.

PARTS LIST

1 Optical instrument
2 Illumination apparatus
3 Lamp housing
4 Light source
5 Lamp base
6 Adjustment linkage
7, 8, 9 Positioning elements
10 Outer wall
11 Back side of lamp housing 3
12 Reflector
13 Tilt alignment element
14 Light exit opening
15 Adjustment linkage
16 Positioning element
17 Setting module
18 Module housing
19, 20, 21, 22 Drive device
23, 24, 25, 26 Linkages
27, 28, 29, 30 Coupling member
31 Wall opening
32 Hook
33 Unlocking device
34 Button
35 Operating console
36 Control device
37 Connecting conductor
38 Data line
39 Laser radiation source
40 Lens
41 Pinhole

What is claimed is:

1. A setting module for an illumination apparatus of an optical instrument, comprising:

a module housing that can be attached to and removed from the illumination apparatus so that the module housing can be removed prior to use of the illumination apparatus;

coupling members, substantially corresponding in number to a number of positioning elements of the illumination apparatus and guided outward through the module housing, which are configured for the transfer of drive motions to the positioning elements and each one of which is positively or nonpositively joined to one of the positioning elements when the module housing is attached, and an interlock device for releasable fastening of the module housing to a lamp housing of the illumination apparatus, wherein the interlock device is separate from the coupling members; and at least one drive device that is housed in the module housing, wherein the illumination apparatus includes a light source and an illuminating optical system, and wherein the positioning elements are configured to modify a position of the light source and a position of the illuminating optical system.

2. The setting module as defined in claim 1, wherein each coupling member has associated with it a separate drive device equipped with a positioning force limiter.

3. The setting module as defined in claim 1, wherein the illumination apparatus is enclosed by the lamp housing, and the interlock device is provided for releasable fastening of the module housing to the lamp housing, the interlock device comprising, on the module side, movable hooks integrated with the module housing which, upon attachment of the module housing, engage into slot-shaped wall openings on the lamp housing; and an unlocking apparatus furthermore being present to release the interlock.

4. The setting module as defined in claim 1, further comprising a controller for generating control outputs for drive devices, and an operating console for the input of commands for adjusting the position of the light source and/or the illuminating optical system, wherein the controller, operating console, and setting module are configured as separate subassemblies configured to be coupled to one another temporarily via connecting conductors, or wherein the controller and the operating console are integrated into the module housing.

5. The setting module as defined in claim 1, wherein the optical instrument comprises a microscope.

6. The setting module as defined in claim 1, wherein the drive device is controllable from outside the module housing.

7. A setting module for alignment of an optical instrument having a light source and an illuminating optical system, comprising:

a module housing configured to be attached to and removed from the optical instrument so that the module housing can be removed prior to use of the optical instrument;

a drive mechanism enclosed within the module housing;

a first coupling member configured to engage a first positioning element of the optical instrument when the module housing is attached to the optical instrument;

a second coupling member configured to engage a second positioning element of the optical instrument when the module housing is attached to the optical instrument, and an interlock device for releasable fastening of the module housing to the optical instrument, wherein the interlock device is separate from the first and second coupling members;

wherein the first coupling member is configured to transfer drive motion from the drive mechanism to the first positioning element to modify a position of the light source, and wherein the second coupling member is configured to transfer drive motion from the drive mechanism to modify a position of the illuminating optical system.

8. The setting module as defined in claim 7, wherein the optical instrument comprises a microscope.

9. The setting module as defined in claim 7, wherein each coupling member has associated with it a separate drive device equipped with a positioning force limiter.

10. An illumination system for an optical instrument, comprising:
   a first subassembly, configured as an illumination apparatus, having a light source, an illuminating optical system, and at least one adjustment device, equipped with positioning elements, for modifying a position of the light source and a position of the illuminating optical system in at least one coordinate direction in each case, surrounded by a lamp housing, wherein the illuminating optical system is selected from the group consisting of a lens system, a mirror system, a combined lens/mirror system, and a fiber optic system; and
   a second subassembly, configured as a setting module, having at least one drive device, coupling members for the transfer of drive motions to the positioning elements, enclosed by a module housing, and an interlock device for releasable fastening of the module housing to the lamp housing, wherein the interlock device is separate from the coupling members;
   the module housing being attachable to and removable from the lamp housing so that the module housing can be removed prior to use of the illumination apparatus; and, when the module housing is attached, each coupling member being in engagement with a respective positioning element for the purpose of transferring the drive motions.

11. The illumination system as defined in claim 10, in which the light source is configured as a laser radiation source, discharge lamp, or other source radiating in the visible or invisible light region.

12. An illumination system for an optical instrument as defined in claim 10, wherein each coupling member has associated with it a separate drive device equipped with a positioning force limiter.

13. An illumination system for an optical instrument as defined in claim 10, further comprising a controller for generating control outputs for drive devices, and an operating console for the input of commands for adjusting the position of the light source and/or the illuminating optical system, wherein the controller, operating console, and setting module are configured as separate subassemblies configured to be coupled to one another temporarily via connecting conductors, or wherein the controller and the operating console are integrated into the module housing.

14. The illumination system as defined in claim 10, wherein the optical instrument comprises a microscope.

15. The illumination system as defined in claim 10, further comprising a controller for the generation of control outputs for drive devices, and an operating console for the input of commands to adjust the position of the light source and/or of the illuminating optical system.

16. The illumination system of claim 10, wherein the lamp housing is sealed from an outside environment.

* * * * *